Dec. 6, 1955  A. B. SKROMME  2,725,704
FORAGE HARVESTER HAVING STALK DIRECTING MEANS
Filed Dec. 17, 1954  3 Sheets-Sheet 1
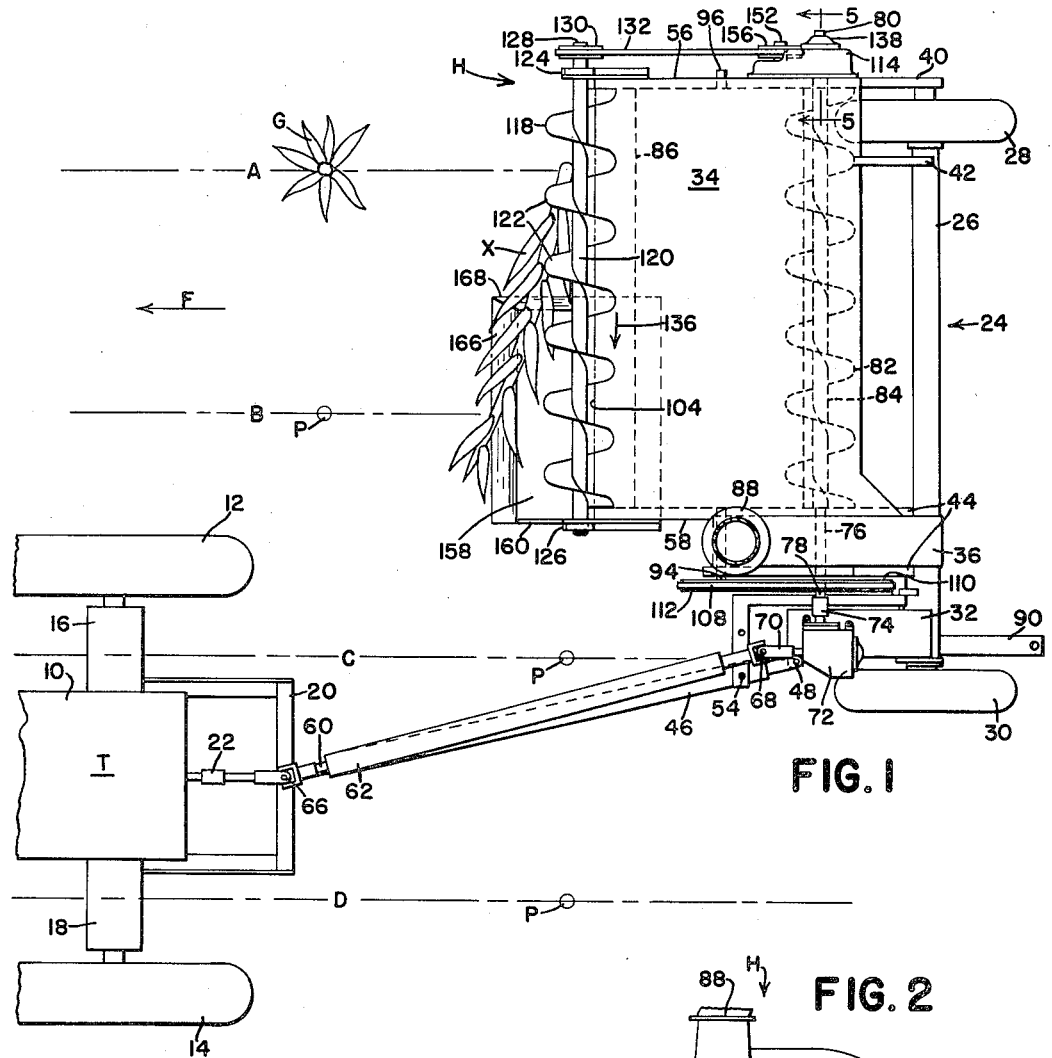
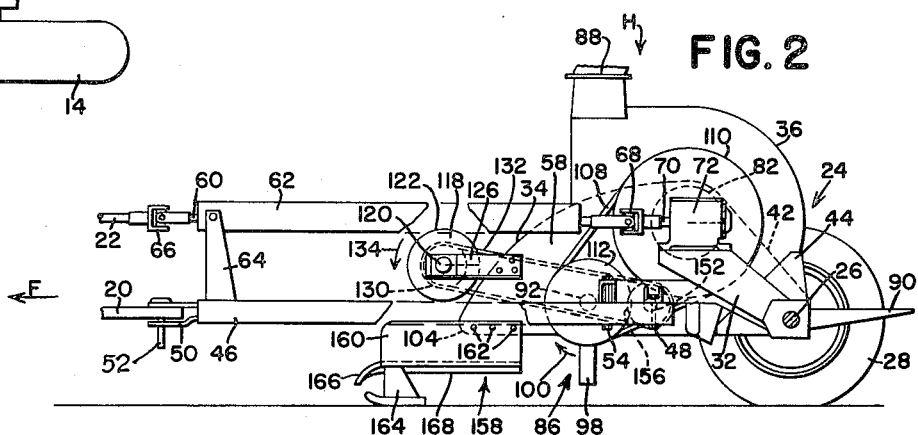
*INVENTOR.*
A. B. SKROMME Dec. 6, 1955  A. B. SKROMME  2,725,704
FORAGE HARVESTER HAVING STALK DIRECTING MEANS
Filed Dec. 17, 1954  3 Sheets-Sheet 2

*INVENTOR.*
A. B. SKROMME

Dec. 6, 1955 A. B. SKROMME 2,725,704
FORAGE HARVESTER HAVING STALK DIRECTING MEANS
Filed Dec. 17, 1954 3 Sheets-Sheet 3

*INVENTOR.*
A. B. SKROMME

United States Patent Office 2,725,704
Patented Dec. 6, 1955

2,725,704

FORAGE HARVESTER HAVING STALK DIRECTING MEANS

Arnold B. Skromme, Ottumwa, Iowa, assignor to Deere Manufacturing Co., Dubuque, Iowa, a corporation of Iowa Application December 17, 1954, Serial No. 476,015

17 Claims. (Cl. 56—15)

This invention relates to a harvester and more particularly to a harvester of the type having a crop-reducing device rotatable about an axis transverse to the line of advance of the machine. Still more particularly, the invention relates to means on a harvester of the character noted for facilitating the handling by that harvester of relatively tall standing stalks planted in the field in conventional rows.

A harvester of the character designated above usually comprises a main frame structure carried on a pair of relatively widely transversely spaced apart wheels and drawn over the field by a tractor or other vehicle to which the harvester is connected by suitable draft structure. The main frame carries transversely thereof an elongated crop-reducing rotor which is enclosed from above by a tunnel-shaped hood, the hood having a front or leading edge spaced at a level above the ground substantially at the level of the axis of rotation of the rotor. The theory of operation of the machine is that as it is propelled over the field the rotor is driven at a relatively high rate of speed and standing crops are severed from the field and are additionally reduced by the rotor knives, being subsequently delivered by the rotor to an appropriate conveyor system for transfer to a trailing vehicle drawn by the harvester.

Machines of this nature are eminently satisfactory in grasses and other low growing crops, including stalks that have been previously severed and left lying on the ground, as well as stalks and other crops that are "down" as distinguished from "standing." However, the basic machine is found to have certain disadvantages in operating in fields of relatively tall standing stalks, since the height of the crop-reducing means or rotor does not usually exceed thirty inches above the ground, which means that the level of the rotating axis of the rotor is about fifteen inches above the ground, whereas the stalks grow to considerable heights, ranging from four to six feet and even more. Since the rotor is enclosed from above by the hood and since the leading edge of the hood is approximately at the level of the axis of the rotor, the hood serves only to "trample" the stalks and to lay them down generally parallel to the line of advance. Hence, even though the rotor immediately passes over the stalks it has little effect on the stalks in a reducing sense. Because the stalks are planted in rows, rather than being sown indiscriminately as is the case of grasses, there is an insufficient mass of stalks to present to the rotor any kind of crop entanglement that could be engaged by and drawn into the rotor for reduction. The result is that the machine merely passes fairly cleanly over the field without reducing any more than a small percentage of crops.

According to the present invention, this disadvantage of a harvester of the character noted is eliminated by the provision of means for directing the standing stalks downwardly and transversely of the line of travel so that when they are engaged by the rotor they are in the best position to be reduced. The invention further features means for supporting the downwardly directed stalks in a substantially horizontal transverse position at a level intermediate the ground and the level of the rotor axis, thereby insuring that the stalks will pass rearwardly to the rotor and will not drop to the ground and remain there while the rotor passes over it. The invention features further the provision of the stalk-handling means as an attachment for a basic harvester of the rotary crop-reducing type. It is a specific object of the invention to provide the stalk-directing means in the form of an auger appropriately driven from power means provided as a conventional part of the machine.

A further object is to provide, in a modified form of the invention, a stalk-directing means in the form of a pair of coaxial screw or auger sections, comprising first and second helical flight portions of opposite hand, especially in association with a crop-supporting means located centrally between a pair of adjacent rows, whereby the crop-directing screws will move crops laterally inwardly and simultaneously onto the centrally located crop-supporting means.

The foregoing and other important objects and desirable features inherent in and encompassed by the invention will become apparent as preferred embodiments of the invention are disclosed in the following specification and accompanying sheets of drawings, the several figures of which are described immediately below.

Fig. 1 is a plan view of a harvester embodying the invention, part of the harvester being shown in section and the rear portion of the tractor being shown in draft relation to a harvester.

Fig. 2 is a side elevational view of the harvester shown in Fig. 1, the portion of the tractor being omitted and portions of the harvester being broken away to expose other parts.

Figure 3:
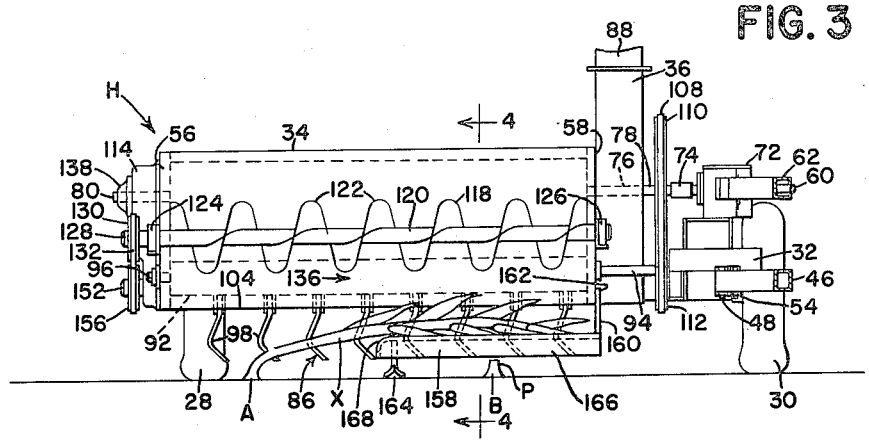
Fig. 3 is a front view of the structure shown in Figs. 1 and 2, the view being in part in section and having other portions thereof omitted in the interests of conserving space.

The harvester, designated generally by the letter H, is adapted to be drawn by a tractor T over a field of relatively tall row-planted standing stalks, a plurality of adjacent rows being designated here as rows A, B, C and D. The direction of advance is designated by the letter F.

A standing stalk is shown at G in row A and the stubble of previously harvested stalks appears at P in rows B, C, and D. A stalk being handled by the machine is identified by the letter X.

The tractor may be of any construction, that shown being typical and therefore having a fore-and-aft or longitudinally extending body 10 supported between right- and left-hand traction wheels 12 and 14 by right- and left-hand axle housings 16 and 18 and including a rearwardly extending drawbar 20 and a rearwardly extending power take-off shaft 22.

The harvester comprises main frame structure, designated in its entirety by the numeral 24, which structure is made up of various supporting and functional components such as a transverse axle 26, carried on right- and left-hand wheels or ground-engaging supports 28 and 30; a stub frame 32 just inwardly of the left-hand wheel 30; a hood 34 of tunnel or inverted U-shaped section; a crop-receiving means or housing 36, adjacent to the stub frame 32; a transverse conveyor trough 38; and various supporting arms such as those shown at 40, 42 and 44 for mounting the hood 34 and housing 36 on the axle 26.

The harvester includes a forwardly extending draft tongue 46, pivotally connected at its rear end at 48 to the stub frame 32 and having at its front end a clevis 50 by means of which and a hitch pin 52 a pivotal connection is established to the tractor drawbar 20. The pivot 48 enables the tongue 46 to be swung laterally between transport and operating positions. In Fig. 1, the tongue 46 is in its operating position and is retained there by a locking pin 54.

The tractor T and harvester H are in laterally offset relationship, with the harvester trailing, of course. The tractor operates with its wheels 12 and 14 astride the rows C and D and the width of the harvester, as determined largely by the tread or lateral spacing between the wheels 28 and 30, is such that the harvester straddles the rows A, B and C. The hood 34 is of such lateral dimension or width as to traverse or straddle rows A and B, having opposite right- and left-hand ends 56 and 58 respectively. These ends 56 and 58 are sometimes hereinafter spoken of as opposite sides and in addition to the designations "right" and "left" may also be referred to as a first end 58 and a second end 56, on which basis the rows B and A may be called, respectively, first and second rows. The first or left-hand end 58 of the hood 34 is thus next adjacent to the crop-receiving housing 36, and this housing is next adjacent to the stub frame 32.

Power for driving the several drivable components of the harvester is obtained from the tractor power take-off shaft 22 by means of a propeller shaft 60, housed in a tube 62 that is supported at 64 on the tongue 46 and having a front universal joint connection 66 to the tractor power take-off shaft 22 and a rear universal joint connection 68 to a forwardly projecting power shaft 70 journaled in a drive mechanism casing 72. The casing 72 is appropriately supported on the stub frame 32 and contains therein suitable drive mechanism (not shown) including a transversely rightwardly extending drive shaft 74 (Figs. 1 and 3).

The crop-receiving housing 36 is and will be subsequently referred to as a blower housing, containing therein a suitable blower fan (not shown) such as that disclosed in the U. S. patent to Thiemann 1,619,277. This fan is coaxial with the drive shaft 74 and is mounted on a cross shaft 76 which runs coaxially of the conveyor trough 38 and which has a first or left-hand end 78 coupled to the casing drive shaft 74 and a second or right-hand end 80 projecting rightwardly beyond the second or right-hand end 56 of the main frame structure as determined by the end of the hood 34.

The conveyor trough 38 carries conveyor means, here in the form of an auger 82 which has a hollow shaft 84 sleeved on the cross shaft 76. The purpose of the auger is to carry leftwardly in the conveyor trough 38 material received from a crop-reducing means or rotor 86, the details of which will be described below. The crops carried by the conveyor means 38—82 enter the blower housing 36 and are delivered from that housing via a discharge spout 88 in a conventional manner. It is common practice to tow a wagon behind the harvester for receiving crops discharged by the blower housing 36 via the spout 88. In the present case, the numeral 90 designates a wagon or trailer hitch for the purpose just described.

The rotor 86 comprises a central shaft 92 having first and second or left- and right-hand ends 94 and 96 appropriately journaled in the end portions or end walls 58 and 59 of the hood 34. Since the hood is part of the main frame structure 24, it follows that the rotor 86 is carried by the main frame structure. Since the rotor shaft 92 extends transverse to the line of advance, said shaft establishes a transverse axis of rotation for the rotor.

The rotor further includes a plurality of crop-engaging and reducing knives or radial arms 98 which, when the rotor rotates in the direction of the arrow 100, engages ground-borne crops, severing the crops from the ground (if not already severed) and reducing such crops while transferring the crops rearwardly to the conveyor 38—82. By means that will be subsequently described, the auger 82 of the conveyor rotates in the direction of the arrow 102 to move the crops to the left and into the blower housing 36 as previously described.

Figure 4:
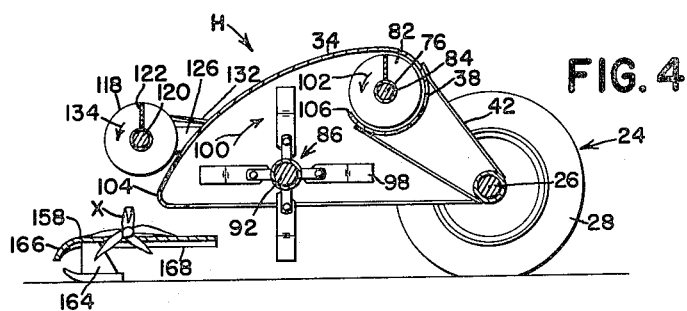
Fig. 4 is a longitudinal sectional view as seen substantially along the line 4—4 of Fig. 3.

Fig. 4 best shows the relationship between the rotor 86 and the auger 82, including the relationship to the two of the hood 34 which, as will be seen in that figure, has a transverse front or leading edge 104 at a level above the ground and approximately at but here slightly below the level of the axis of the rotor shaft 92. The hood curves upwardly and rearwardly from the leading edge 104 and overlies and joins the conveyor trough 38, leaving an interior transverse inlet 106 by means of which crops departing from the rotor 86 gain entrance to the trough 38.

The rotor is driven in the direction indicated by means of a drive belt 108 trained about a large sheave 110, fast on the left-hand end portion 78 of the cross shaft 76, and a small sheave 112, fixed to the left-hand end 94 of the rotor shaft 92.

The second or right-hand end of the machine, as represented by the right-hand end 56 of the hood 34, carries thereon a casing 114 within which is housed drive mechanism 116 for driving the conveyor auger or screw 82 as well as for driving a crop-directing means or drivable device in the form of a screw 118 carried by the main frame structure for rotation about a transverse horizontal axis as represented by a central auger shaft 120. The stalk auger or crop-directing screw 118 has thereon crop-engaging members 122 in the form of the helical flight of the auger. The auger 118 is substantially coextensive in length with the width of the hood 34 and therefore has its opposite ends appropriately journaled respectively in right- and left-hand supports 124 and 126, these supports being secured respectively to the hood end walls 56 and 58.

The right-hand end of the stalk auger shaft 120 projects at 128 rightwardly beyond the right-hand support 124 and has fast thereon a sheave 130. A belt 132, trained about this sheave and driven by the drive mechanism 116, drives the stalk auger 118 in the direction of the arrow 134 (Figs. 2 and 4) and the flighting 122 on the auger is such that stalks engaged by the auger will be moved leftwardly or in the direction of the arrow 136 (Figs. 1 and 3).

Figure 5:
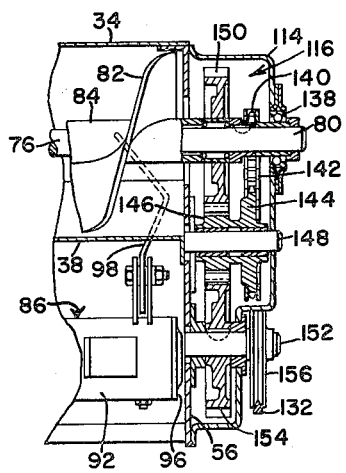
Fig. 5 is a sectional view, on an enlarged scale, as seen along the line 5—5 of Fig. 1.

The drive mechanism 116, which is effective to drive the conveyor auger 82 and stalk auger 118 from the drive casing output shaft 74 is best shown in Fig. 5. As previously described, the cross shaft 76 is connected at its left-hand end 78 to the transverse output shaft 74 that projects rightwardly from the casing 72. It has also been stated that the right-hand end 80 of the cross shaft 76 projects rightwardly beyond the right-hand end of the hollow conveyor shaft 84. The extreme right-hand end of the shaft 80 is appropriately journaled in a bearing 138 in the casing 114 but within the casing the shaft has keyed thereto a small sprocket 140 which, by means of a chain 142, drives an intermediate cluster comprising a sprocket 144 and a coaxial gear 146, this sprocket and this gear being integrally joined and journaled on an idler shaft 148. The gear or pinion 146 is in constant mesh with a somewhat larger gear or pinion 150 that is fixed to the hollow conveyor auger shaft 84. Because of the speed-reduction between 140 and 144 and between 146 and 150, the conveyor auger 82 is driven at approximately one-quarter the speed of the cross shaft 76 and in the opposite direction, which is consistent with the requirement that the blower (not shown) conventionally carried in the blower housing 36 should rotate at a relatively high speed while the conveyor auger 82 rotates at a relatively lower speed.

The casing 114 carries below the idler shaft 148 an output shaft 152 to which is keyed a gear 154 in constant mesh with the gear or pinion 146. The shaft 152 projects externally of the casing 114 and has fast thereon a sheave 156. The belt 132 is trained about this sheave 156.

Possible confusion in comprehending Fig. 5 will be avoided if it is recognized that the shaft 152 is not coaxial with the rotor shaft 92 and therefore is not to be confused with the right-hand end 96 of said rotor shaft, all of which will be apparent by considering that the shaft 152 is considerably to the rear of the rotor shaft, as will be seen best in Figs. 1 and 2.

Because of the gear reduction between 146 and 154, the stalk auger 118 is driven at a speed somewhat less than that of the conveyor auger 82. The directions of rotations of the augers 82 and 118 are the same, as indicated by the arrows 102 and 134 respectively.

From the description thus far it will be seen that as the machine advances over the field, in which the standing stalks G are still growing in row A, and in which stalks from the rows B, C and D have been previously harvested so as to leave only the stubble at P, the forward travel of the machine will tend to deflect stalks such as G forwardly. However, since the stalk auger 118 is operating ahead of the leading edge 104 of the hood 34, the auger flights 122 are effective to engage the stalk G and to deflect it laterally toward the row B as shown at X. Of course, the lateral movement of the stalk as influenced by the auger 118 will be combined with forward movement of the stalk as influenced by forward travel of the machine. Nevertheless, the combination of the two forces will prevent the stalk from being forced into a position parallel to the line of advance; rather, the stalk will lie transversely to the line of advance and substantially horizontally as best shown in Figs. 3 and 4, the butt end of the stalk remaining attached to the ground. It should be understood, of course, that the drawings are somewhat schematic in their illustration of what happens to the stalk, since it would be virtually impossible to illustrate in great detail the commingled positions of the several stalks that would be handled in the normal operation of the machine. Nevertheless, it is expected that the illustration will suffice to give some indication of the effectiveness of the stalk auger 118.

In some situations, depending upon the quantity and condition of the stalks, the machine may function efficiently if the stalks are merely directed to the ground transversely to the rotor 86. However, in other cases, it is found that there is need for some support ahead of the rotor to receive the transversely directed stalks and to temporarily support them against falling to the ground until they pass rearwardly to the rotor 86. In accordance with that desire, the present invention provides a crop- or stalk-supporting element in the form of a plate-like means 158 which is positioned ahead of the rotor 86 and traversing the row B. Stated otherwise, the width of the plate 158 is substantially one-half of the length of the rotor 86. The plate has at its lefthand end an upright shield 160 which serves here not only as means for attaching the plate to the main frame structure via connection at 162 to the forward portion of the hood end wall 58, but as means for confining the ends of stalks to the left-hand end of the rotor 86. That is to say, even though the stalk X had grown to a height considerably greater than that suggested in the drawings, the end wall or upright shield 160 will, as the stalk moves rearwardly when the machine advances, turn the free end of the stalk into the zone or swath of the rotor 86. The rear end of the plate 158 is unobstructed so that the directed stalks may move rearwardly into the path of the rotor knives 98 as the rotor 86 rotates in the direction of the arrow 100.

The level of the plate 158 is intermediate the ground and the leading edge 104 of the hood 34, which edge, as previously described, is approximately at the level of the rotor axis as represented by the rotor shaft 92.

The plate 158 is additionally supported at this level by ground-engaging means in the form of a skid 164 secured to the right-hand end of the plate. The forward or leading edge of the plate is turned downwardly, as at 166, to facilitate the lifting of down stalks. Likewise, the right-hand edge of the plate is curved downwardly at 168 to provide a smooth entrance for the transversely directed stalks.

The machine equipped as shown in the drawings is especially adapted for use in the harvesting of stalks, according to the manner described. When it is desired to use the machine for the harvesting of grasses or other crops that grow in such abundance as to make the harvesting thereof relatively easy without the use of the stalk auger 118 and the plate means 158, these two elements may be readily removed, since, as previously pointed out, it is a feature of the invention to provide them in the form of attachable and detachable components. Thus, the brackets 124 and 126 may be easily removed from the end walls 56 and 58 of the hood 34, which enables the auger 118 to be readily dismounted. The plate 158 is, of course, easily dismounted by removing the fastening means at 162. The belt 132 may be readily removed from the sheave 156 and the machine is ready for operation without the stalk auger and plate means. Consequently, the machine is versatile, at least to the extent that it is capable for use on various types of crops.

Figure 6:
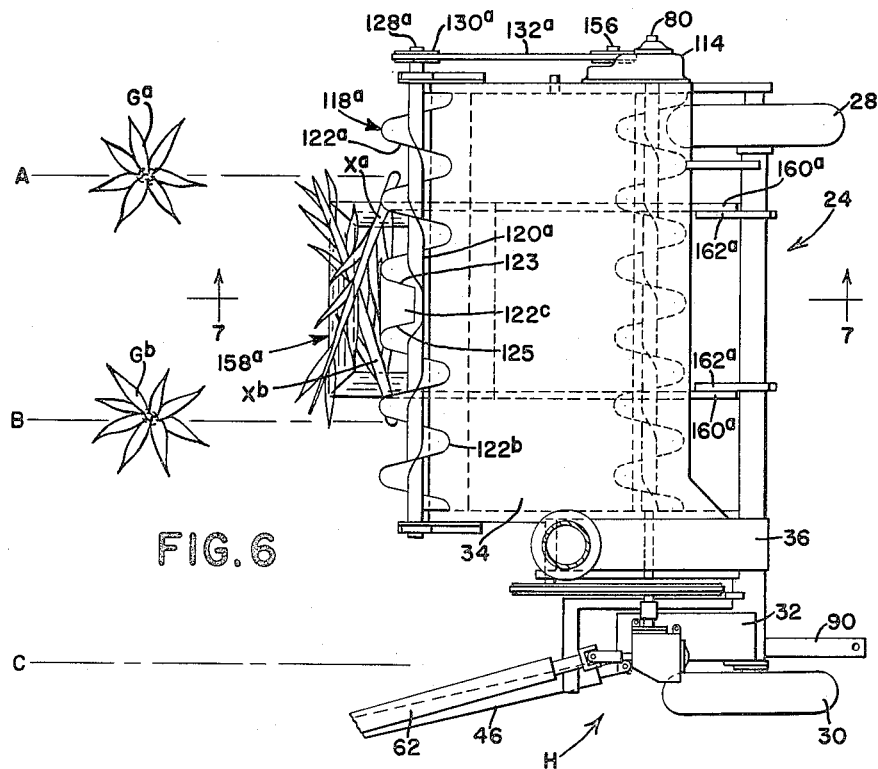
Fig. 6 is a plan view, similar to Fig. 1, but omitting the tractor and illustrating another form of the invention.
Figure 7:
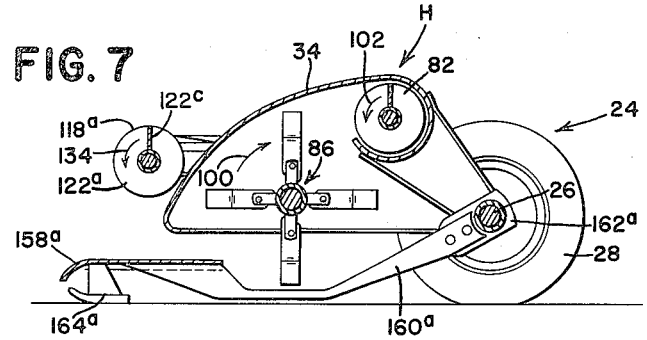
Fig. 7 is a longitudinal sectional view as seen substantially along the line 7—7 of Fig. 6.

The foregoing advantages, plus others, will flow from the use of the modified form of the invention as shown in Figs. 6 and 7. It will be noted that the basic harvester structure H is identical to that previously illustrated and described and accordingly repetition will be avoided, at least to an extent consistent with clarity. However, reference characters will be used sparingly to identify major components. Coordination between the two designs will be apparent from the use, in the modified form of the invention, of previously used reference characters to each of which has been added the exponent "a."

With the foregoing in mind, the modified form of the invention will be recognized as differing fundamentally from that previously described on the basis of a difference in the crop-directing means 118$^a$ and the crop-receiving or crop-supporting means 158$^a$. Because of these differences, the details of which will presently appear, the harvester is adapted to operate simultaneously on two rows of crops or stalks. Hence, the machine is shown in relation to or astride rows A and B, in which standing or growing stalks G$^a$ and G$^b$ are illustrated. The crop-directing means or screw 118$^a$ has a common shaft 120$^a$ to the right-hand end 123$^a$ of which is keyed a sheave 130$^a$ which is driven by a belt 132$^a$ from the drive mechanism in the casing 114.

The conveyor or screw 118$^a$ comprises first and second or left-hand and right-hand helical flight portions 122$^b$ and 122$^a$, respectively. These sections or portions of the helical conveyor are of opposite hand so that the stalks as at X$^a$ from row A are moved to the left and stalks as at X$^b$ from the row B are moved to the right. The conveyor or screw sections 122$^a$ and 122$^b$ have laterally spaced apart terminal ends 123 and 125 which are joined by a transverse plate section in the form of a beater 122$^c$.

The crop-supporting means or plate element 158$^a$ is centrally disposed between the rows A and B, having a width less than that of the rotor 86, and being laterally offset relative to both rows A and B. The screw sections 122$^a$ and 122$^b$, as already described, move the stalks laterally inwardly and then downwardly onto the plate 158$^a$, from which plate the stalks move rearwardly to be reduced by the rotor 86.

Supporting of the plate 158$^a$ may be accomplished by a pair of longitudinally extending supports 160$^a$, the rear ends of which are connected to the axle 126 by suitable mounting means 162ª. The forward portion of the plate 158ª is shown as being carried by a skid or runner 164ª.

Since the driving of the screw 118ª is identical to the driving of the screw 118, these details need not be elaborated. Other similarities between the two forms of the invention are deemed to be sufficiently obvious as to require no separate treatment. The fundamental differences have been described and it is thought that the operation of the modified form of attachment on the harvester H will be obvious from the foregoing description.

Other features of the invention not categorically enumerated herein will undoubtedly occur to those versed in the art, as will many modifications and alterations in the preferred embodiment of the invention disclosed, all of which may be achieved without departing from the spirit and scope of the invention.

What is claimed is:

1. A harvester adapted to advance over a field of row-planted crops, comprising: main frame structure; rotary crop-reducing means carried by the main frame structure for rotation about a transverse axis and of such width as to extend over at least two adjacent crop rows; a crop-supporting element carried by the main frame structure ahead of the crop-reducing means and at a level above the ground but below the axis of said means, said element having a width sufficient to extend over only one of the aforesaid two rows; crop-directing means carried by the main frame structure ahead of the crop-reducing means and substantially in transverse alinement with the aforesaid element, said crop-directing means being positioned over the other row of the aforesaid two rows and operative to cause crops from said other row to move transversely and downwardly onto said element for rearward movement of such crops off of said element to be engaged by the crop-reducing means; and means for driving the crop-reducing means.

2. The invention defined in claim 1, in which: the crop-directing means includes members movable transversely toward the crop-supporting element; and drive means interconnects said crop-directing means and the means for driving the crop-reducing means.

3. The invention defined in claim 1, in which: the crop-directing means includes a screw conveyor rotatable on a transverse axis and having crop-engaging flights thereon; and drive means interconnects said crop-directing means and the means for driving the crop-reducing means in such direction as to cause said flights to move toward the crop-supporting element.

4. The invention defined in claim 1, in which: the crop-supporting element has transversely spaced apart end portions; one end portion is connected to the main frame structure; and ground-engaging means rides the ground and sustains the other end portion.

5. The invention defined in claim 1, in which: the main frame structure has first and second transversely spaced apart opposite sides and carries at the first side crop-receiving means including a rotary member rotatable on a transverse axis; the main frame structure further carries transversely elongated conveyor means behind and for receiving reduced crops from the crop-reducing means, said conveyor means having a first end adjacent to and for feeding such crops to said crop-receiving means and further having a second end adjacent to said second side of the main frame structure; said conveyor has a conveyor member rotatable on a transverse axis and having an input end portion drivingly connected to the aforesaid rotary member and an output end portion at said second end of the conveyor means; the crop-directing means is a drivable device having members movable transversely toward the crop-supporting element, said drivable device having an input end proximate to the aforesaid output end portion and driven thereby; and said means for driving the crop-reducing means includes a driving connection to the rotary member in the crop-receiving means.

6. A harvester adapted to advance over a field of row-planted crops, comprising: main frame structure; rotary crop-reducing means carried by the main frame structure for rotation about a transverse axis and of such width as to extend over at least two adjacent crop rows; a transverse hood of inverted U-shaped section carried by the main frame structure and overlying the crop-reducing means, said hood having a leading transverse portion ahead of the crop-reducing means and at approximately the level of the aforesaid transverse axis; a screw conveyor rotatable on a transverse axis and carried by said transverse portion of the hood for engaging crops to move such crops transversely in front of the crop-reducing means; and means for driving the screw conveyor.

7. A harvester adapted to advance over a field of tall, row-planted standing stalks, comprising: main frame structure; rotary crop-reducing means carried by the main frame structure for rotation about an axis transverse to the line of advance, said means being of a height materially lower than that of the standing stalks and of such width as to traverse first and second adjacent rows in the field and having first and second transversely spaced apart opposite ends projecting respectively transversely beyond said first and second rows; and stalk-directing means carried by the main frame and engageable with standing stalks in the second row for moving said standing stalks transversely toward the first row and also downwardly to substantially horizontal and transverse positions ahead of the crop-reducing means and at a level below the axis of rotation of said crop-reducing means.

8. The invention defined in claim 7, including: a stalk-supporting plate means carried by the main frame structure ahead of and adjacent to the first end of the crop-reducing means and substantially horizontally positioned at a level intermediate the ground and said axis of rotation for receiving at least in part the second-row stalks moved by the stalk-directing means.

9. The invention defined in claim 7, including: a transverse hood of inverted U-shaped section overlying the crop-reducing means and having first and second end portions respectively closing the first and second ends of said crop-reducing means; and the plate means is carried by the main frame structure via attachment to the first end portion of the hood.

10. The invention defined in claim 9, in which: said attachment of the plate means to the first end portion of the hood comprises an upright shield for confining received stalks against projection endwise beyond the first end of the crop-reducing means.

11. A harvester adapted to advance over a field of row-planted crops, comprising: main frame structure; rotary crop-reducing means carried by the main frame structure for rotation about a transverse axis and of such width as to extend over at least two adjacent crop rows; a transverse support carried by the main frame structure ahead of the crop-reducing means and at approximately the level of the aforesaid transverse axis; a screw conveyor rotatable on a transverse axis and carried by said transverse support for engaging crops to move such crops transversely in front of the crop-reducing means; and means for driving the screw conveyor.

12. The invention defined in claim 11, in which: the screw conveyor is substantially coextensive in length with the width of the crop-reducing means and includes first and second coaxial helical flight portions, said first portion being positioned to engage crops in one of said two adjacent rows and said second portion being positioned to engage crops in the other of said two adjacent rows; and said flight portions are of opposite hand so as to move the respective engaged crops transversely toward each other and substantially centrally of the width of the crop-reducing means.

13. The invention defined in claim 12, in which: the main frame structure carries substantially centrally thereof and ahead of the crop-reducing means a crop-receiving element positioned closely above the ground to receive the conveyor-moved crops.

14. A harvester adapted to advance over a field of row-planted crops, comprising main frame structure; rotary crop-reducing means carried by the main frame structure for rotation about a transverse axis and of such width as to extend over at least two adjacent crop rows; a crop-supporting element carried by the main frame structure ahead of the crop-reducing means and at a level closely above the ground but below the axis of said means, said element having a width less than that of the crop-reducing means and positioned in laterally offset relation to at least one of the aforesaid two rows; crop-directing means carried by the main frame structure ahead of the crop-reducing means and substantially in transverse alignment with the aforesaid elements, said crop-directing means being positioned over said one of the aforesaid two rows and operative to cause crops from said one row to move transversely and downwardly onto said element for rearward movement of such crops off of said element to be engaged by the crop-reducing means; and means for driving the crop-reducing means.

15. The invention defined in claim 14, in which: the width of the crop-supporting element is less than the spacing between the rows so as to lie between said rows and thereby to be laterally offset relative to both rows; and the crop-directing means is constructed and arranged to move crops from both of said rows laterally toward each other and downwardly onto said element for rearward movement as aforesaid.

16. The invention defined in claim 15, in which the crop-directing means comprises a pair of crop-engaging screws of opposite hand.

17. The invention defined in claim 16, in which the screws are coaxial, are mounted on a common shaft, and have their terminal inner ends spaced laterally apart; and beater means is mounted on the shaft between said spaced-apart terminal ends of the screws.

No references cited.